United States Patent [19]

Oudelette

[11] Patent Number: 4,635,389
[45] Date of Patent: Jan. 13, 1987

[54] EAR TAG FOR MARKING ANIMALS

[75] Inventor: Gilles Oudelette, Vitre, France

[73] Assignee: Societe Nouvelle Rockall France S.A., Vitre, France

[21] Appl. No.: 773,308

[22] Filed: Sep. 5, 1985

[30] Foreign Application Priority Data

Sep. 7, 1984 [FR] France .................. 84 13794

[51] Int. Cl.⁴ .............................. G09F 3/00
[52] U.S. Cl. ...................................... 40/301
[58] Field of Search .................. 40/301, 302, 300; 119/156

[56] References Cited

U.S. PATENT DOCUMENTS 4,581,834  4/1986  Zatkos et al. .................. 40/301

FOREIGN PATENT DOCUMENTS 56533     7/1982  European Pat. Off. ........... 40/301
717707    1/1932  France .......................... 40/301
2510205   1/1983  France .......................... 40/301
8102068  11/1982  Netherlands ..................... 40/301
2041833   9/1980  United Kingdom ............. 40/301

Primary Examiner—Robert P. Swiatek
Assistant Examiner—Cary E. Stone
Attorney, Agent, or Firm—Blakely, Sokoloff, Taylor & Zafman

[57] ABSTRACT

The ear tag comprises a male part having a stem with a head portion at one end, the head portion forming an external shoulder, and a female part with an opening through which the head portion can be passed. The area surrounding the opening forms a shoulder which engages with the shoulder formed by the head portion to lock the head portion in place. A hollow boss is formed with the female part and encloses the opening and head portion when it has been passed through the opening. A collar is located within the boss, this collar having an internal rim which abuts the shoulder of the female part. The collar is deformable to enable said head portion, when engaged through said opening, to pass the internal rim and become located with the collar such as to be retained by the collar within the boss.

11 Claims, 4 Drawing Figures

EAR TAG FOR MARKING ANIMALS

This invention relates to an ear tag for marking animals.

A known form of ear tag for marking animals comprises a male component and a female component both of which are formed from a resilient plastics material. The male component includes a stem, the free-end of which has a head portion. This head portion can include or be formed by a hard material element. The stem of the male component has an axial bore therein and a pin of an applicator tool can fit in the bore and positively engage with the hard material element.

The female component includes an opening which is of a diameter similar to that of the stem. Preferably a hollow cylindrical boss or wall is formed as part of the female component and is concentric with the opening. To fit the tag in an animal's ear the hard material element is forced by the applicator pin through the ear and the opening in the female component such that the head portion lies within the area bounded by the the cylindrical boss or wall. The two components are locked together by the engagement of the shoulder formed by the area of material surrounding the opening of the female component and a shoulder formed by the head portion of the male component.

Preferably the hollow cylindrical boss is closed at the end opposite to the aforesaid opening through which the head portion of the male component is inserted. This closing of the boss prevents assess to the head portion from taking place in order to push the head portion back through the opening. It does not however, prevent the head from being pulled back through the opening by the application to a pulling force to the stem.

In addition it has been observed that the softening temperature of the resilient plastics material which is generally used for ear tag construction is relatively low so that an increase in ambient temperature is sometimes sufficient to significantly lessen the locking action of the shoulders of the male and female components. Consequently the tag can be accidentally freed from the animal's ear when the ambient temperature is high or it can be removed by a defrauder increasing the temperature of the female component to lessen the locking action and thereby separate the two components intact. When the temperature returns to normal the plastic resumes its original shape and retentive properties and the tag components may thus be used again by the defrauder and applied to another animal.

The object of the present invention to provide an eartag which has a construction such that the head portion of the male part of a tag is effectively retained, even at high temperatures, the retention being such that any efforts to separate the head portion from the female part of the tag will result in the tag being damaged. Accordingly a tag can be prevented from being accidentally removed from the animals ear even at higher ambient temperatures or removed by a defrauder. If a attempt is made to remove the tag this will result in damage to both the male and female parts, rendering both parts unusable.

To achieve this object the invention, according to a first broad aspect, comprises an ear tag for marking animals, such tag comprising a male part having a stem with a head portion at the end thereof said head portion forming a shoulder extending outwardly from said stem and a female part having an opening of a diameter through which the stem can locate, a hollow enclosed boss surrounding the opening to receive said head portion when the head portion has been passed through said opening, the area about said opening forming a shoulder which locks the head portion in place, characterized in that a collar, made of a material which has a softening temperature higher from that which the enclosed boss is formed, is located within said boss, said collar having an internal rim which abuts against the said shoulder of the female part, the collar being deformable to enable said head portion, when engaged through said opening, to pass the internal rim and become located with the collar such as to be retained by the collar within the boss.

In a preferred embodiment of the invention the internal diameter of the rim of the collar is less than the diameter of the stem. In addition it is preferred that the collar be freely located within the enclosed boss such that the collar can rotate therein. The foregoing preferred arrangements result in the male and female parts being free to rotate relative to one another when they are joined. This ability to rotate and the resilient nature of the tag parts insure that the tag parts can flex or move should the tag become snagged in barb wire, bush or the like.

In the following more detailed description of the ear tag according to the present invention reference will be made to the accompanying drawings in which.

Figure 1:
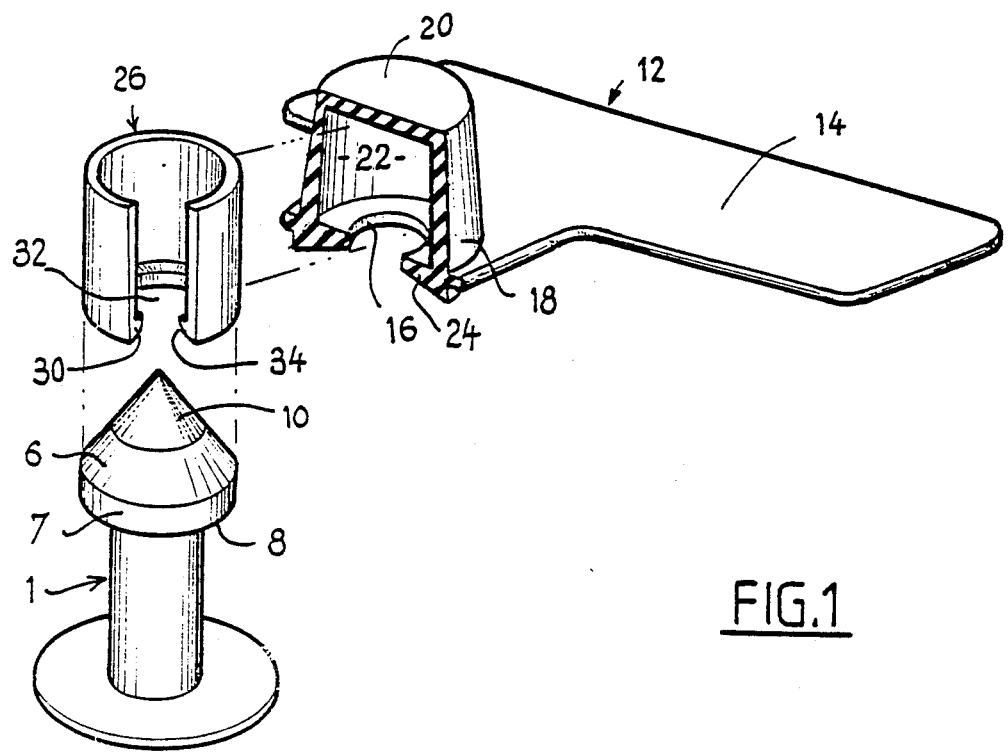
FIG. 1 is an open perspective, with partial cross-section view of ear tag according to the invention.

The eartag of the present invention as illustrated in the drawings is a two-piece tag having a male component 1 and female component 12. The male component 1 is formed by a panel 2 from which extends a stem 4. A head portion 6 is formed at the end of stem 4 and this forms an externally projecting shoulder 8. Preferably the panel 2, stem 4 and a part of head portion 6 are moulded integrally from a resilient plastics material such as polyurethane. In the preferred form a hard material element or tip 10, of plastics or metal, is moulded with the head portion and a conic head is thus formed. The stem 4 is hollow such that a rigid pin from an applicator tool can be engaged in the stem to positively locate with the hard tip 10.

Figure 3:
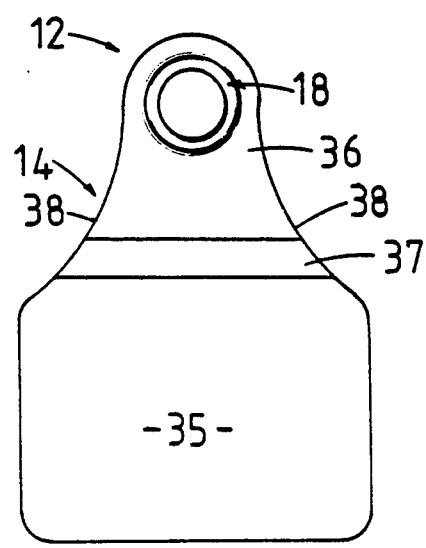
FIG. 3 is an elevational view of a further embodiment of the female component of the eartag.

The female component 12 is formed with a panel 14 having the shape shown in either of FIGS. 1 or 3 or some other suitable shape. Panel 14 includes an opening 16, the diameter of which is preferably larger than that of stem 4. In the preferred form of the invention the diameters of the opening 16 and stem 4 are such that the clearance is sufficient to enable the stem to rotate within the opening. A boss 18 is located over the opening 16 and is of a substantially cylindrical shape. Boss 18 is enclosed by an end cover 20 located at the opposite end of the boss to the opening 16. Boss 18 provides a substantially cylindrical cavity 22 which opens to the exterior solely through opening 16.

The diameter of cavity 22 is larger than opening 16 and in fact has a diameter which is significantly greater than the largest cross-sectional diameter of the conic head portion 6 of the male component. The area of material around the opening 16 forms an annular shoulder 24 which is capable of forming a sufficiently rigid support to hold the collar 26 within the cavity 22.

Figure 2:
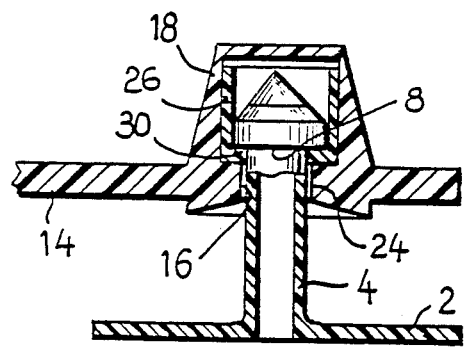
FIG. 2 is an longitudinal cross-section view of the tag of FIG. 1 after the two components have been joined together.

The substantially cylindrical collar 26 is located within cavity 22 as shown in FIG. 2 and the diameter of the collar 26, when the head portion 6 is located within the collar, is preferably less than that of cavity 22. Collar 26 is provided at its lower end with an internal rim 30 which forms an aperture 32 having a diameter which is less than the diameter of the stem 4 of the male component.

The cylindrical cavity 22, collar 26 and opening 16 are coaxial. Collar 26 is preferably expandable and to this end it is split longitudinally. In the relaxed or initial form of the collar 26 the internal diameter of the collar is less than the greatest cross-sectional diameter or the head portion 6. Accordingly when the head 6 of the male component is passed through opening 16 and the aperture 32 of collar 26 so as to be located within the collar 26 the base 7 of head 6 expands collar 26 so that it takes up a larger diameter than its initial diameter. Accordingly the head portion 6 of the male component is firmly held within collar 26. In addition it is preferred that the interference between the stem and the aperture 32 ensures that the stem is firmly gripped by the rim of the collar. With the head portion 6 within the collar the external diameter of the collar is still less than the internal cavity 22 such that the collar can rotate therein. As the head and stem are firmly gripped by the collar then the collar, head and stem can rotate as a unit.

With the ear tag so assembled the head 6 of the male component is maintained inside collar 26 and can only be withdrawn by considerable pulling force being applied to the stem. This pulling force is preferably greater than 35 dN and such pulling force usually results in the head 6 being decoupled from the stem 4. As a consequence the head remains within the cavity 22 resulting in the female or male component being so damaged that neither is reusable.

Collar 26 is made of a rigid material which may be a plastics material such as a polyamide with or without fibre reinforcing such as fibreglass. Alternatively collar 26 can be made of a metal material having good elastic characteristics. The collar is thus made of a material which softens only at a relatively high temperature and is at a temperature which is clearly superior to the softening temperature of the resilient plastics material forming the female component. This relatively high temperature is one which would not normally be reached in ambient atmosphere.

The collar 26 also possesses a deformation coefficient under stress which is superior to that of the material used for the female component. Consequently an accidental or voluntary increase in temperature capable of softening the boss 18 would not modify the shape of collar 26. The collar will thus reinforce boss 18 and so maintain its shape. In order to destroy the link between collar 26 and boss 18 it would thus be necessary to damage the boss completely. Such damage, however, would be noticeable and would thus prevent the ear tag from being used again.

The totally enclosed boss 18 ensures that the closure 20 prevents disengagement of the male component from the female component with an applicated tool used in reverse. As a result the ear tag according to the present invention cannot be dismantled without being damaged and thus constituents a practical tamper-proof tag.

Preferably the axial length of collar 26 is less than that of cavity 22 and thus the collar is permitted to slide within the cavity. The slit 34 in collar 26 is sufficiently wide to enable the collar to be compacted so that its external diameter can be sufficiently reduced to enable the collar to be inserted into the cavity 22 through opening 16.

This means that the female component can be moulded and the collar inserted after moulding. The material of which the collar is made has an "elastic memory" sufficent for it to retain its initial shape once it is within the cavity. The collar thus opens out inside the cavity thereby preventing it being removed. This elasticity also facilitates the insertion of head portion 6 through the lesser diameter aperture 32 and the rigid locking of the head against the internal rim 30 supported by the shoulder 24 of the female component.

The presence of the hard material collar within the boss also permits the boss to be moulded with the thin wall section. It is, however, preferred that the wall of the boss be of increasing cross-sectional thickness as can be clearly seen in FIG. 2. The increased thickness of plastics material in the area of opening 16 ensures that there is sufficient support by the shoulder 24 to retain the collar 26 within the enclosed boss 18.

Figure 4:
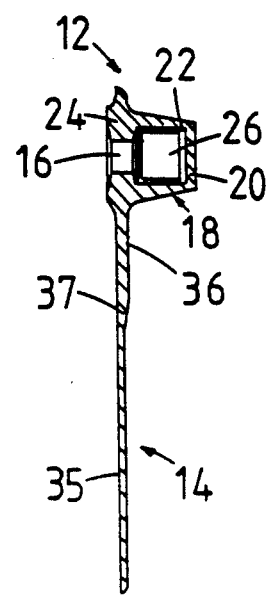
FIG. 4 is a sectioned side view of the female component shown in FIG. 3.

In FIGS. 3 and 4 there is shown a particular form of construction of the female component. In this form of the female component the main part 35 of panel 14 is of significantly less cross-sectional thickness than portion 36 in which the opening 16 and boss 18 are formed. Area 36 is joined to the main part 35 of panel 14 through a transitional transverse portion 37 which is of decreasing thickness. This transitional portion 37 is located in what can be termed a neck portion of the component where the sides 38 of the portion 36 curve smoothly toward the transition with main part 35 of the panel. This construction leads to reduction in stress concentrations in the neck portion due to the curved side edges 38 whilst enabling the mounting portion 36 to be formed of greater cross-sectional thickness than the panel portion 35 thereby increasing the strength of the mounting portion 36.

I claim:

1. An ear tag for marking animals such tag comprising a male part having a stem with a head portion at the end thereof said head portion forming a shoulder extending outwardly of said stem and a female part having an opening through which the stem can locate and a hollow enclosed boss surrounding the opening to receive said head portion when the head portion has been passed through said opening, the area about said opening forming a shoulder which locks the head portion in place, a collar made of material which has a softening temperature higher than that from which the enclosed boss is formed is located within said boss, said collar having an internal rim which abuts against the said shoulder of the female part, the collar being radially expandable to enable said head portion, when engaged through said opening, to pass the internal rim and become located with the collar such as to be retained by the collar within the boss.

2. An ear tag as claimed in claim 1 wherein the internal diameter of the rim of the collar is less than the diameter of the stem.

3. An ear tag or claimed in claim 1 wherein the collar is freely located within the enclosed boss such that the collar can rotate therein.

4. An ear tag as claimed in claim 3 wherein the stem is freely rotatable within the opening and that the wall of the boss is of increasing thickness toward said opening.

5. An ear tag as claimed in claim 1 wherein a longitudinal slit is formed in the collar such that the collar is expandable when the head portion is inserted, said slit also being such that the collar can be radially compacted and inserted into the enclosed boss through the opening in the female part and regain its initial shape once positioned within the boss.

6. An ear tag as claimed in claim 5 wherein the collar is formed from a rigid plastics material such as a polyamid.

7. An ear tag as claimed in claim 5 wherein the collar is formed from a metal possessing good elastic properties.

8. An ear tag as claimed in claim 5 wherein the collar is formed from a rigid plastics material such as a polyamid with fibre reinforcement.

9. An ear tag as claimed in claim 1 wherein the hollow boss defines a cylindrical cavity in which the collar is located said cavity being of a length greater than the length of the collar.

10. An ear tag as claimed in claim 9 wherein the head portion of the male part has a length which is substantially the same as the axial length of the collar.

11. An ear tag or claimed in claim 1 wherein the female part includes a panel formed by a portion to receive indicia and a mounting portion, said mounting portion incorporating the opening and boss, the mounting portion being of greater cross sectional thickness than the indicia bearing portion the mounting portion and indicia receiving portion being coupled together by a transverse transitional portion which is of increasing thickness toward the mounting portion.

* * * * *